(12) United States Patent
Zhang et al.

(10) Patent No.: US 11,204,172 B2
(45) Date of Patent: Dec. 21, 2021

(54) BURNER CAP

(71) Applicant: Ningbo Fotile Kitchen Ware Co., Ltd., Ningbo (CN)

(72) Inventors: Bo Zhang, Ningbo (CN); Xiaogang Liu, Ningbo (CN); Qiang Xu, Ningbo (CN); Junmei Zheng, Ningbo (CN)

(73) Assignee: Ningbo Fotile Kitchen Ware Co., Ltd., Ningbo (CN)

( * ) Notice: Subject to any disclaimer, the term of this patent is extended or adjusted under 35 U.S.C. 154(b) by 0 days.

(21) Appl. No.: 17/250,105

(22) PCT Filed: Mar. 13, 2019

(86) PCT No.: PCT/CN2019/077985
§ 371 (c)(1),
(2) Date: Nov. 25, 2020

(87) PCT Pub. No.: WO2019/233152
PCT Pub. Date: Dec. 12, 2019

(65) Prior Publication Data
US 2021/0215343 A1    Jul. 15, 2021

(30) Foreign Application Priority Data
Jun. 3, 2018 (CN) .......................... 201810560224.6

(51) Int. Cl.
*F24C 3/08* (2006.01)
*F23D 14/06* (2006.01)

(52) U.S. Cl.
CPC .............. *F24C 3/085* (2013.01); *F23D 14/06* (2013.01)

(58) Field of Classification Search
CPC ................................. F24C 3/085; F23D 14/06
USPC ............................................... 126/39 E, 39 R
See application file for complete search history.

(56) References Cited

U.S. PATENT DOCUMENTS 3,627,462 A * 12/1971 Lotter .................... F23D 14/06
431/284

* cited by examiner

*Primary Examiner* — Vivek K Shirsat
(74) *Attorney, Agent, or Firm* — Wang Law Firm, Inc.

(57) ABSTRACT

The present invention discloses a burner cap. The burner cap comprises a main body (1) with an annular wall (10), a plurality of first main fire holes (11) is defined on the upper layer, and a plurality of second main fire holes (12) is defined on the lower layer; the annular wall (10) has an annular groove (2), and the annular wall (10) also has a fire holding channel (21), which connects to the annular groove (2) and connects to the first main fire holes (11), and/or the second main fire holes (12). So that the burner cap can significantly improve the combustion efficiency of the gas range while holding the flame from the first and second main fire holes.

7 Claims, 5 Drawing Sheets

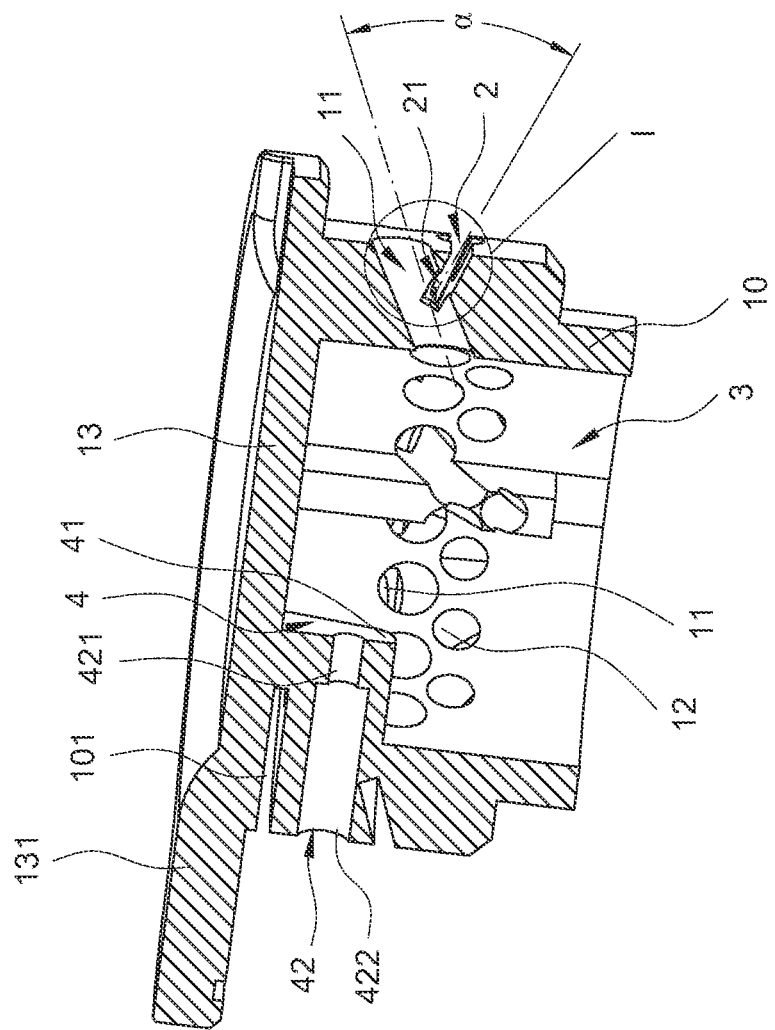
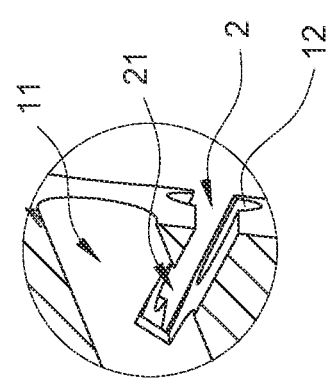

BURNER CAP

TECHNICAL FIELD OF THE INVENTION

The present invention relates to a burner cap for cookers, and in particular to a cap with a better flame holding effect.

BACKGROUND OF THE INVENTION

At present, a cap of a gas range usually consists of a top wall, an annular inner side wall and an annular outer side wall, and a plurality of main fire holes are formed on the annular outer side wall of the cap along the circumferential direction. For existing gas ranges, the annular outer side wall of the cap only comprises a single row of fire holes, with reference to Chinese patent CN2842216Y titled "A cone-flame cap for a gas range burner" and also to Chinese patent CN202149492U titled "A burner"

The combustion mode using a single row of main fire holes disclosed above has the defects that the flame is easy to flicker after combustion and the combustion area is unsteady. At the same time, the single row of fire holes lead not only to low combustion thermal efficiency of the gas range but also to incomplete combustion of the gas, thus resulting in CO emissions and contributing to the environmental pollution. To avoid these defects, Chinese patent CN206191590U titled "A cap component of a gas range" discloses a cap component of a gas range, comprising a base and a cap body adapted to the base, wherein a plurality of inner fire holes are arranged on an inner side wall of the cap body along the circumferential direction, and double rows of outer fire holes are arranged on an outer side wall of the cap body along the circumferential direction and include a plurality of first outer fire holes in the first row and a plurality of second fire holes in the second row which are staggered with each other. The combustion efficiency of the gas range is effectively improved by a structure in which the double rows of outer fire holes are arranged on the outer side wall, and the first and second fire holes are staggered with each other. The second outer fire holes can also serve as ire holding channels of the first outer fire holes to hold the flame from the first outer fire holes, so that the combustion of gas is more sufficient. But while this cap solves the flame holding problem of the first outer fire holes in the upper row, the flame from the second outer fire holes in the lower row is easily lifted, causing the failure of the entire burner to burn normally.

SUMMARY OF THE INVENTION

It is an object of the present invention to provide a burner cap with double rows of fire holes for a good flame holding effect.

For achieving the above object, the burner cap comprises: a main body with an annular wall formed by an upper layer and a lower layer, a plurality of first main fire holes being defined on the upper layer, and a plurality of second main fire holes being defined on the lower layer; wherein the annular wall has an annular groove circumferentially located between the first main fire holes and the second main fire holes on a peripheral surface of the annular wall, and the annular wall also has a fire holding channel, which connects to intersects the annular groove and connects to the first main fire holes, and/or the second main fire holes.

Preferably, to avoid flame lifting of the first main fire hole due to too fast gas flow, each fire holding hole is not communicated with the second main fire holes but only with the first main fire holes, and is interleaved in sequence with the second main fire holes. As each ire holding channel is not communicated with the second main fire hole but only with the first main fire hole, on the one hand, the outflow of gas can be diverted from the first main fire holes to slow down the outflow velocity of gas from the first main fire port and make the gas burn steadily without flame lifting, and on the other hand, the ire holding channels in the grooves below the first main fire holes will be connected to form a ring of flame to hold the flame from the second main fire holes in the lower row, so that a good flame holding effect for the second main fire holes is achieved. To better hold the flame from the second main fire holes so as to achieve a better flame holding effect, the ire holding channels are staggered with the second main fire holes in sequence.

Similarly, to better hold the flame from the second main fire holes so as to achieve a better flame holding effect, each fire holding hole has an inlet end which is communicated with the first main fire hole and an outlet end which is communicated with the annular groove, each fire holding hole slopes downward from the inlet end to the outlet end and gradually approaches the second main fire hole from the outlet end.

To better guide the gas flowing out of the first main fire holes into the groove, an angle α defined between a center line of the fire holding hole and the first main fire hole is an acute angle.

Preferably, a diameter of a portion of the cap main body where the first main fire holes are located is greater than that of a portion of the cap main body where the second main fire holes are located, so that the portion where the first main fire holes are located can subtly serve as a waterproof eave over the second main fire holes.

Preferably, the cap main body has a top wall, a gas mixing chamber is defined by the an inner surface of the top wall and the annular wall; an ignition chamber is defined adjacent to the annular wall and above the gas mixing chamber, the annular wall adjacent to the ignition chamber has at least one gas inlet communicating with the gas mixing chamber, and the annular wall also has a fire outlet communicating with the ignition chamber at a position corresponding to the ignition chamber.

To further avoid flame lifting due to too fast outflow velocity of gas from the ignition chamber, the annular wall has an ignition hole, the fire outlet comprises a first fire outlet section and a second fire outlet section which are sequentially arranged from inside to outside, and the first fire outlet section has a length shorter than that of the second fire outlet section. Meanwhile, the second fire outlet section can form a stable pressure area which can ensure the steady flow of the ignition chamber, thus holding the flame from the fire outlet and improving the success rate of ignition.

To further avoid flame lifting due to too fast outflow velocity of gas from the ignition chamber, a gas outlet is disposed on the annular wall of the cap main body and above the fire outlet and the gas outlet is in fluid communication with the gas mixing chamber, and an area of the gas outlet is greater than that of the fire outlet.

To avoid the ignition failure when the fire outlet is clogged with overflow, an peripheral edge of the top wall of the cap main body extends outward to form a waterproof eave covering over the gas outlet, the fire outlet, the first main fire holes and the second main fire holes.

Compared with the prior art, the present invention has the following advantages. The double rows of main fire holes, namely the first main fire holes and the second main fire holes, are provided on the annular wall of the main body, and a pressure stabilizing portion consisting of annular grooves is arranged between the double rows of main fire holes, so that the burner cap can significantly improve the combustion efficiency of the gas range while holding the flame from the first and second main fire holes.

BRIEF DESCRIPTION OF THE DRAWINGS

FIG. 5 is a sectional view of FIG. 4;
FIG. 6 is an enlarged view of Part-I in FIG. 5.

DETAILED DESCRIPTION OF THE INVENTION

The present invention will be further described below in detail by embodiments with reference to the accompanying drawings.

Embodiment 1

Figure 1:
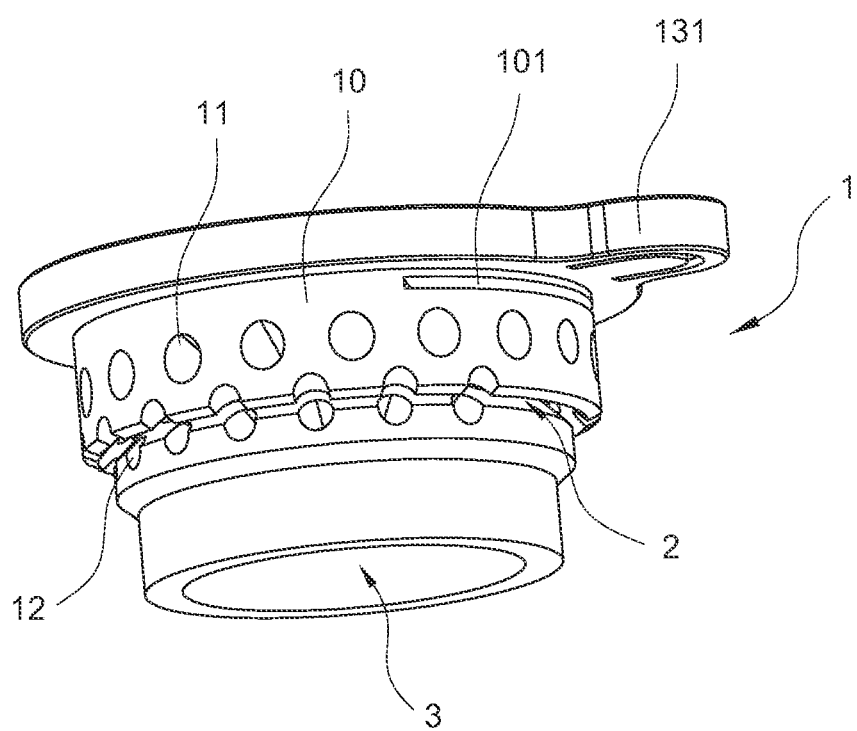
FIG. 1 is a perspective view of a burner cap according to Embodiment 1 of the present invention.
Figure 2:
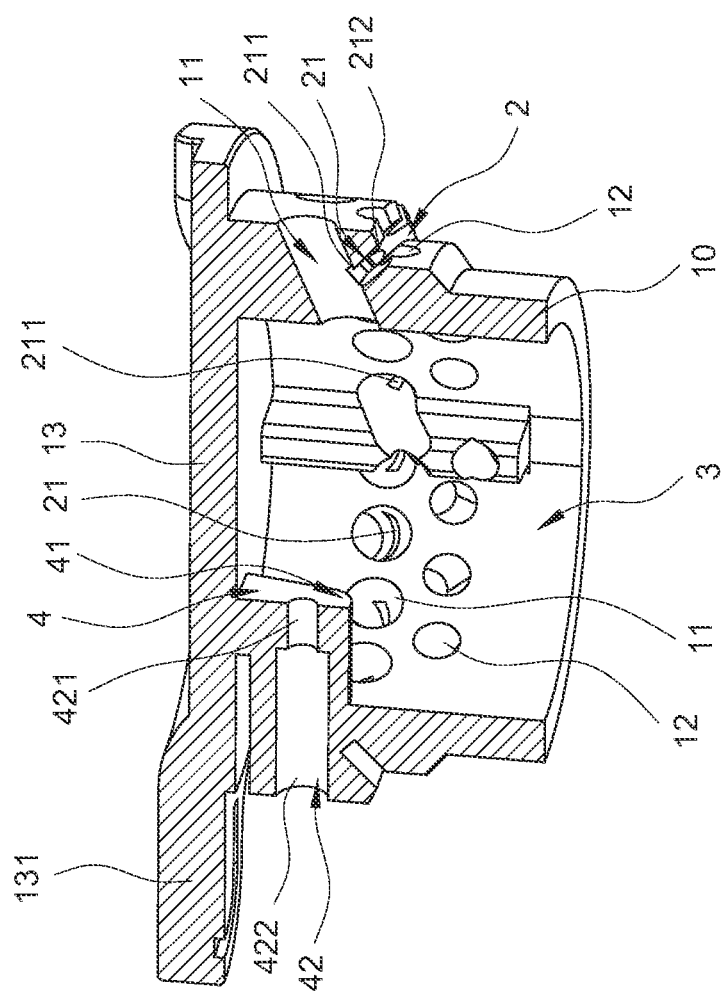
FIG. 2 is a sectional view of FIG. 1.
Figure 3:
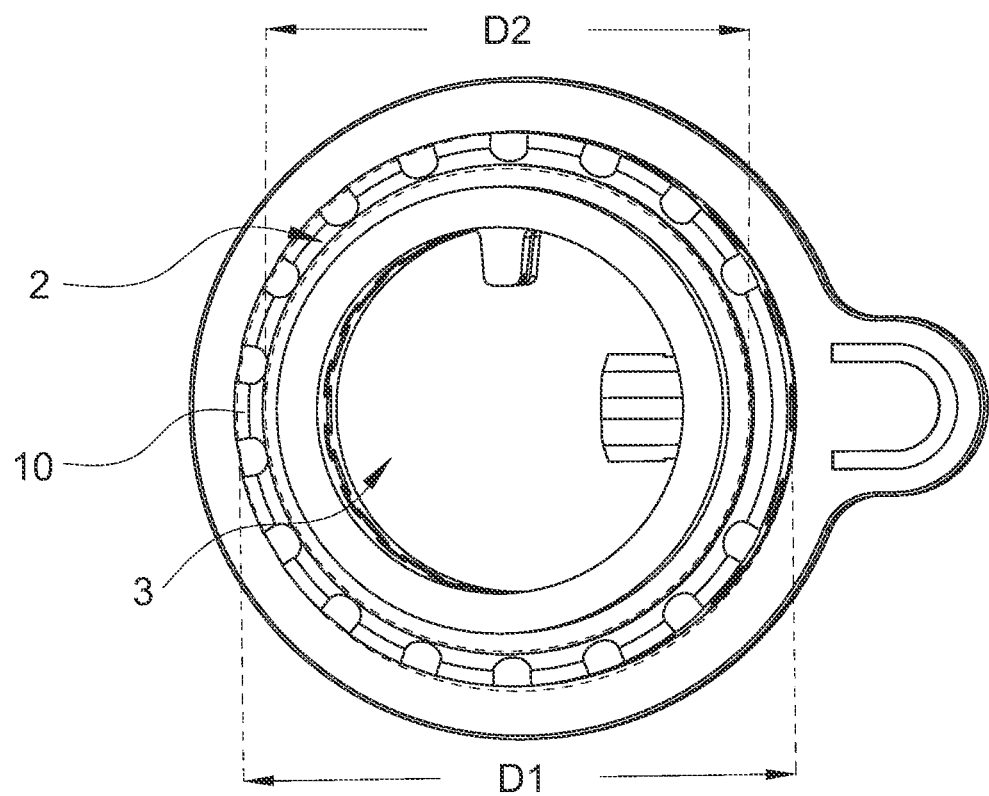
FIG. 3 is a bottom view of FIG. 1.

FIGS. 1-3 show a first embodiment of a burner cap of the present invention. The burner cap comprises a main body 1 with an annular wall 10.

The annular wall 10 is formed by an upper layer and a lower layer. A plurality of first main fire holes 11 are defined on the upper layer, which are all located in the same radial direction of the annular wall 10, and a plurality of second main fire holes 12 are defined on the lower layer, which are all located in the same radial direction of the annular wall 10. Each first main fire hole 11 and each second main fire hole 12 are communicated with a gas mixing chamber 3 and uniformly distributed at intervals along the circumferential direction of the annular wall 10.

At the same time, the annular wall 10 has an annular groove 2 circumferentially located between the first main fire holes 11 and the second main fire holes 12 on a peripheral surface of the annular wall 10, and the annular groove 2 does not transversely run through the annular wall 10, that is, the annular groove 2 is not communicated with the gas mixing chamber 3.

The annular wall 10 also has a fire holding channel 21, which connects to the annular groove 2 and connects to the first main fire holes 11, and/or the second main fire holes 12. In this embodiment, the annular groove 2 has the fire holding channel 21 communicated with the first main fire hole 11. Of course, the fire holding channel 21 on the annular groove 2 may also directly communicate the first main fire hole 11 with the second main fire hole 12 or may be directly communicated with the second main fire hole 12.

To avoid flame lifting of the first main fire hole 11 due to excessive gas flow, each fire holding channel 21 is not communicated with the second main fire holes 12 but only with the first main fire holes 11, and is interleaved in sequence with the second main fire holes 12. As each fire holding channel 21 is not communicated with the second main fire holes 12 but only with the first main fire holes 11, on the one hand, the outflow of gas can be diverted from the first main fire holes 11 to slow down the outflow velocity of gas from the first main fire holes 11 and make the gas burn steadily without flame lift, and on the other hand, the fire holding channel 21 is interleaved in sequence with the second main fire holes 12 and connected in the annular groove 2 below the first main fire holes 11 to form a ring of flame to hold the flame from the second main fire holes 12 in the lower row, so that a good flame holding effect for the second main fire holes 12 is achieved.

Similarly, to better hold the flame from the second main fire holes 12 so as to achieve a better flame holding effect, each fire holding channel 21 has an inlet end 211 which is communicated with the first main fire hole 11 and an outlet end 212 which is communicated with the annular groove 2, each fire holding channel 21 slopes downward from the inlet end 211 to the outlet end 212 and gradually approaches the second main fire hole 12 from the outlet end 212. Also, to better guide the gas flowing out of the first main fire hole 11 into the annular groove 2, an angle α defined between a center line of the fire holding channel 21 and the first main fire hole 11 is an acute angle.

As shown in FIG. 3, a diameter of a portion of the cap main body 1 where the first main fire holes 11 are located is greater than that of a portion of the cap main body 1 where the second main fire holes 12 are located, so that the portion where the first main fire holes 11 are located can subtly serve as a waterproof eave 131 over the second main fire holes 12 to prevent the second main fire holes 12 from being clogged with overflow.

In addition, to improve the success rate of ignition, the cap main body 1 has a top wall 13, a gas mixing chamber 3 is defined by the an inner surface of the top wall 13 and the annular wall 10; an ignition chamber 4 is defined adjacent to the annular wall 10 and above the gas mixing chamber 3, the annular wall 10 adjacent to the ignition chamber 4 has at least one gas inlet 41 communicating with the gas mixing chamber 3, and the annular wall 10 also has a fire outlet 42 communicating with the ignition chamber 4 at a position corresponding to the ignition chamber 4 in the radial direction.

To avoid too fast outflow velocity of gas from the ignition chamber 4, the annular wall 10 has an ignition hole. In this embodiment, one of the first main fire holes 11 serves as the ignition hole.

In this embodiment, the fire outlet 42 comprises a first fire outlet section 421 and a second fire outlet section 422 which are sequentially arranged from inside to outside, and the first fire outlet section 421 has a length shorter than that of the second fire outlet section 422. Meanwhile, the second fire outlet section 422 can form a stable pressure area which can ensure the steady flow of the ignition chamber 4, thus holding the flame from the fire outlet 42 and improving the success rate of ignition. To further avoid flame lifting due to too fast outflow velocity of gas from the ignition chamber 4, a gas outlet 101 is disposed on the annular wall 10 of the cap main body 1 and above the fire outlet 42 and the gas outlet 101 is in fluid communication with the gas mixing chamber 3, and an area of the gas outlet 101 is greater than that of the fire outlet 42. An peripheral edge of the top wall 13 of the cap main body 1 extends outward to form a waterproof eave 131 covering over the gas outlet 101, the fire outlet 42, the first main fire holes 11 and the second main fire holes 12, so that the double security of the gas outlet 101 and the waterproof eave 131 can avoid the ignition failure even if the fire outlet 42 is clogged with overflow.

Embodiment 2

Figure 4:
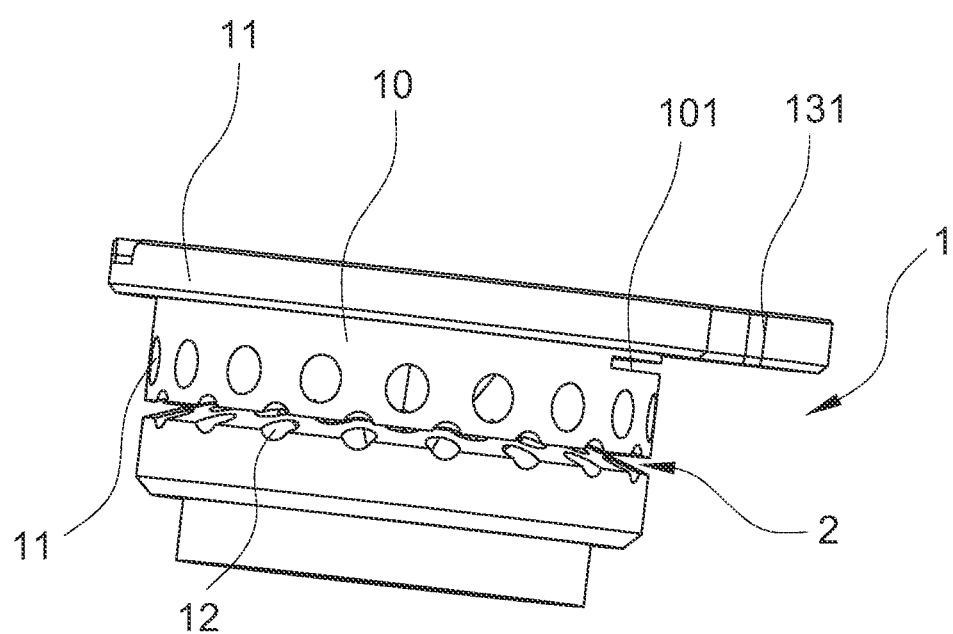
FIG. 4 is a perspective view of the burner cap according to Embodiment 2 of the present invention.

FIGS. 4-6 show a second embodiment of the burner cap of the present invention. The structure in this embodiment is basically the same as that in Embodiment 1, the difference is that: the diameter D1 of the portion where the first main fire holes 11 are located is equal to that D2 of the portion where the second main fire holes 12 are located.

The invention claimed is:

1. A burner cap, comprising:
   a cap main body (1) with a top wall (13) and an annular wall (10) formed by an upper layer and a lower layer, a plurality of first main fire holes (11) being defined on the upper layer, and a plurality of second main fire holes (12) being defined on the lower layer;
   a gas mixing chamber (3) is defined by an inner surface of the top wall (13) and the annular wall (10),
   an ignition chamber (4) is defined adjacent to the annular wall (10) and above the gas mixing chamber (3), the annular wall (10) adjacent to the ignition chamber (4) has at least one gas inlet (41) communicating with the gas mixing chamber (3), and the annular wall (10) also has a fire outlet (42) communicating with the ignition chamber (4) at a position corresponding to the ignition chamber (4),
   wherein
   the annular wall (10) has an annular groove (2) circumferentially located between the first main fire holes (11) and the second main fire holes (12) on a peripheral surface of the annular wall (10), and the annular wall (10) also has a plurality of fire holding channels (21), each fire holding channel (21) connecting to the annular groove (2) and corresponding to one of the plurality of first main fire holes (11) and/or one of the plurality of second main fire holes (12); and
   the annular wall (10) has an ignition hole, the fire outlet (42) comprises a first fire outlet section (421) and a second fire outlet section (422) which are sequentially arranged from inside to outside, and the first fire outlet section (421) has a length shorter than that of the second fire outlet section (422).

2. The burner cap of claim 1, wherein each fire holding channel (21) is not communicated with the second main fire holes (12) but only with the first main fire holes (11), and is interleaved in sequence with the second main fire holes (12).

3. The burner cap of claim 2, wherein each fire holding channel (21) has an inlet end (211) which is communicated with the first main fire hole (11) and an outlet end (212) which is communicated with the annular groove (2), each fire holding channel (21) slopes downward from the inlet end (211) to the outlet end (212) and approaches the second main fire hole (12) from the outlet end (212).

4. The burner cap of claim 1, wherein an angle $\alpha$ defined between a center line of each fire holding channel (21) and each first main fire hole (11) is an acute angle.

5. The burner cap of claim 1, wherein a diameter of the upper layer of the annular wall (10) is greater than that of a diameter of the lower layer of the annular wall (10).

6. The burner cap of claim 1, wherein a gas outlet (101) is disposed on the annular wall (10) of the cap main body (1) and above the fire outlet (42) and the gas outlet (101) is in fluid communication with the gas mixing chamber (3), and an area of the gas outlet (101) is greater than that of the fire outlet (42).

7. The burner cap of claim 1, wherein an peripheral edge of the top wall (13) of the cap main body (1) extends outward to form a waterproof eave (131) covering over the gas outlet (101), the fire outlet (42), the plurality of first main fire holes (11) and the plurality of second main fire holes (12).

\* \* \* \* \*